July 8, 1947.  F. J. FINK  2,423,696
POLYGONAL GENERATING TOOL
Filed Feb. 24, 1944  4 Sheets-Sheet 1
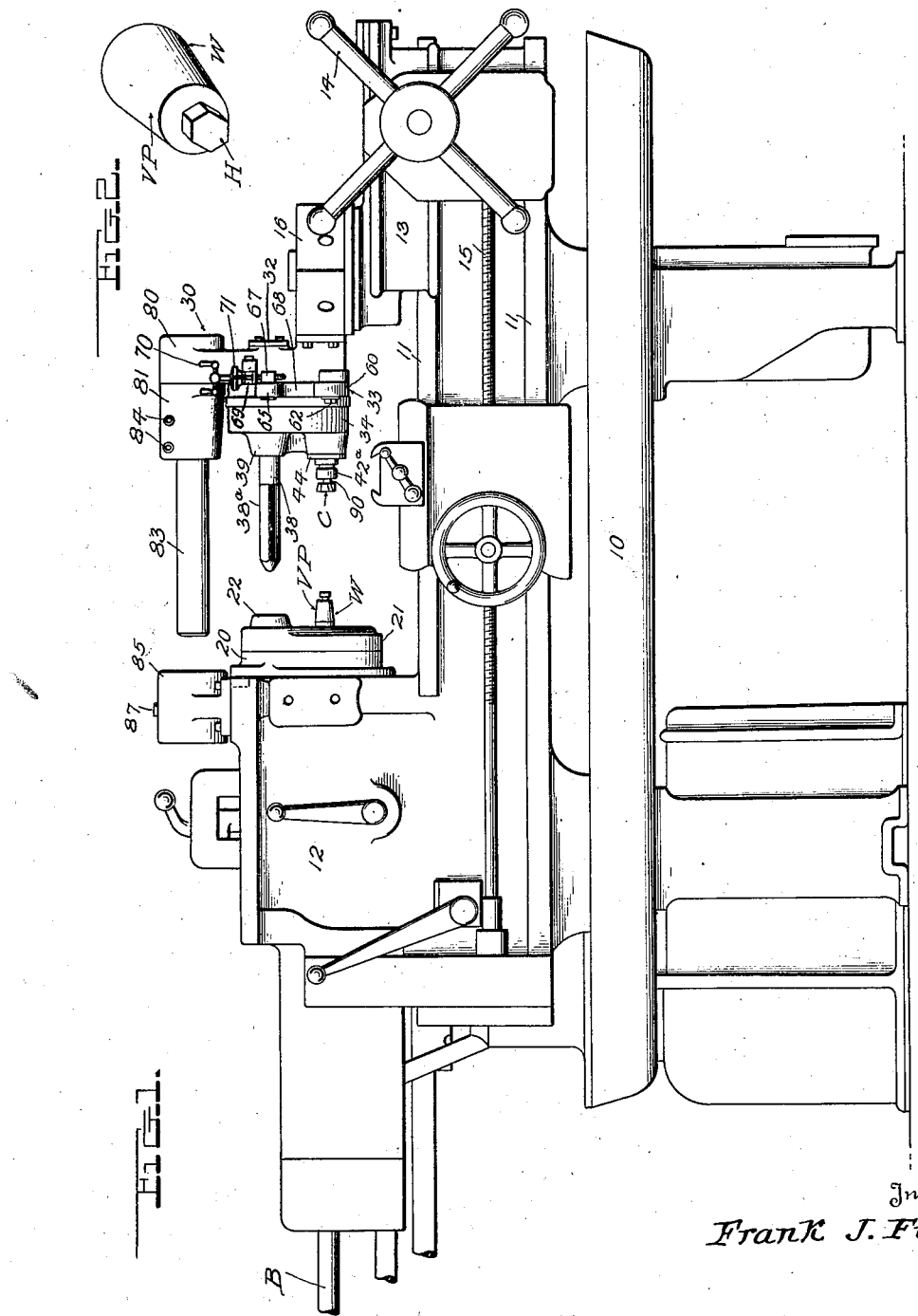
Inventor
Frank J. Fink.
By Mason, Porter & Diller
Attorneys July 8, 1947.  F. J. FINK  2,423,696
POLYGONAL GENERATING TOOL
Filed Feb. 24, 1944  4 Sheets-Sheet 2
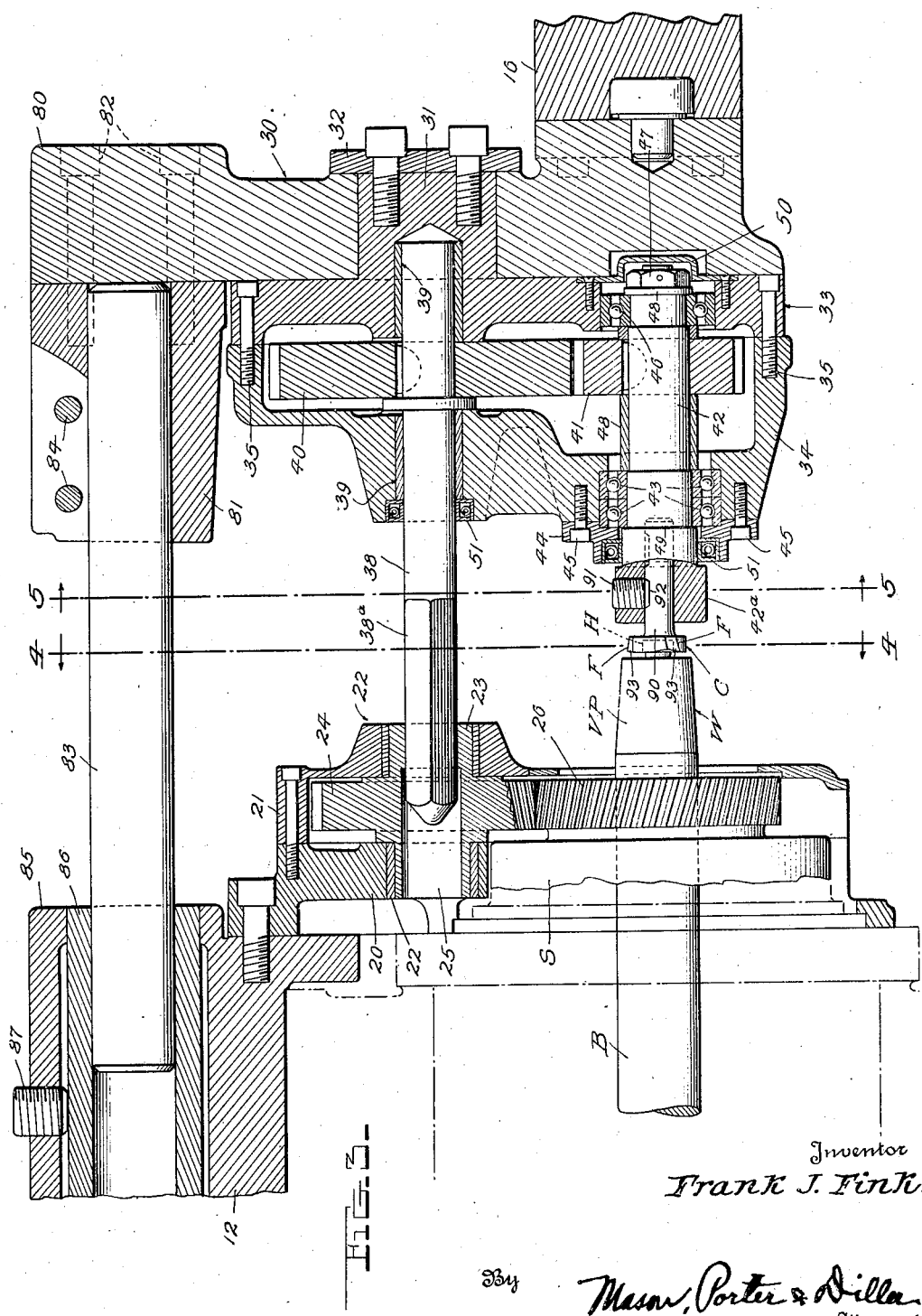
Inventor
Frank J. Fink.
By Mason, Porter & Diller
Attorneys

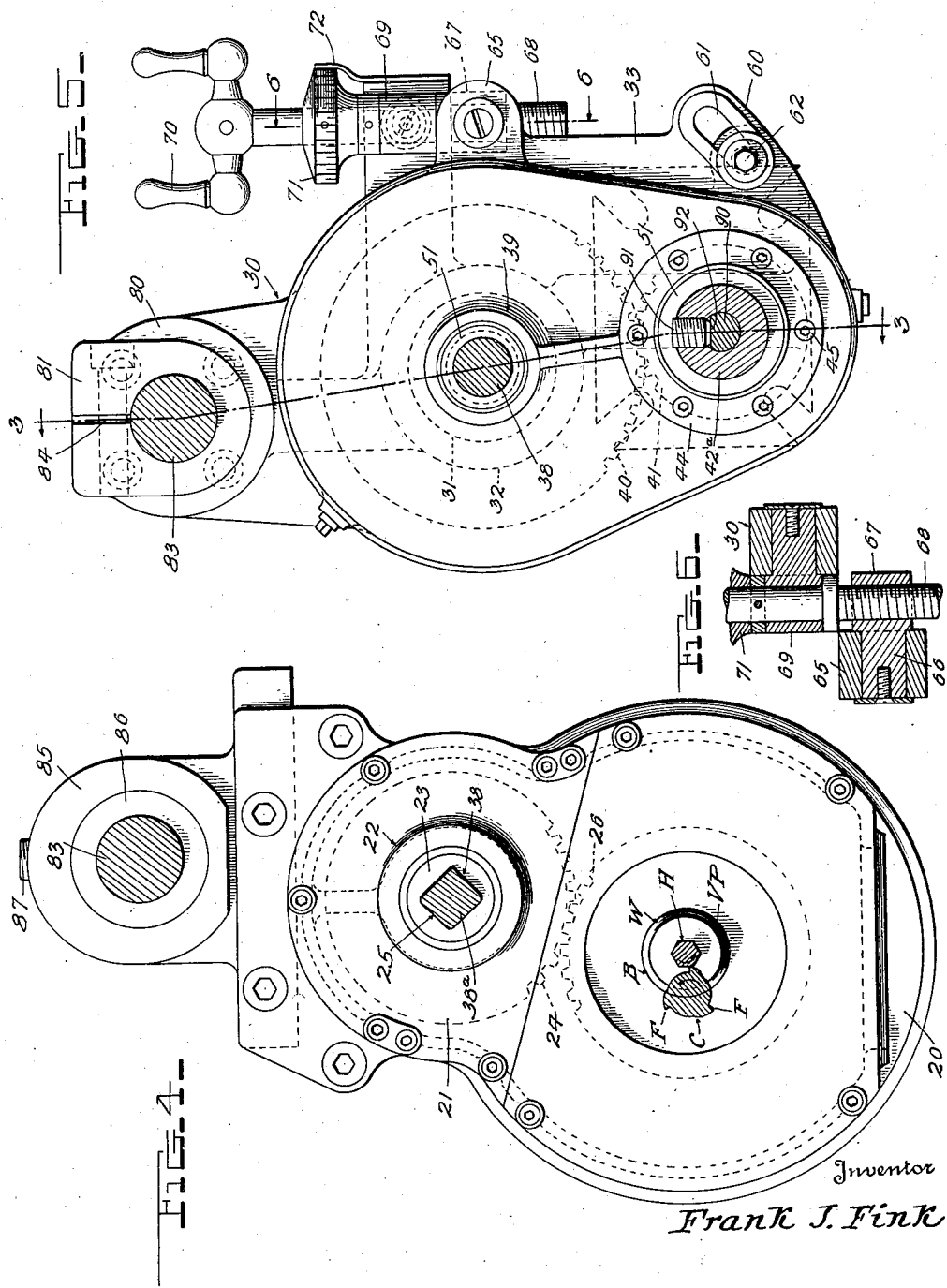

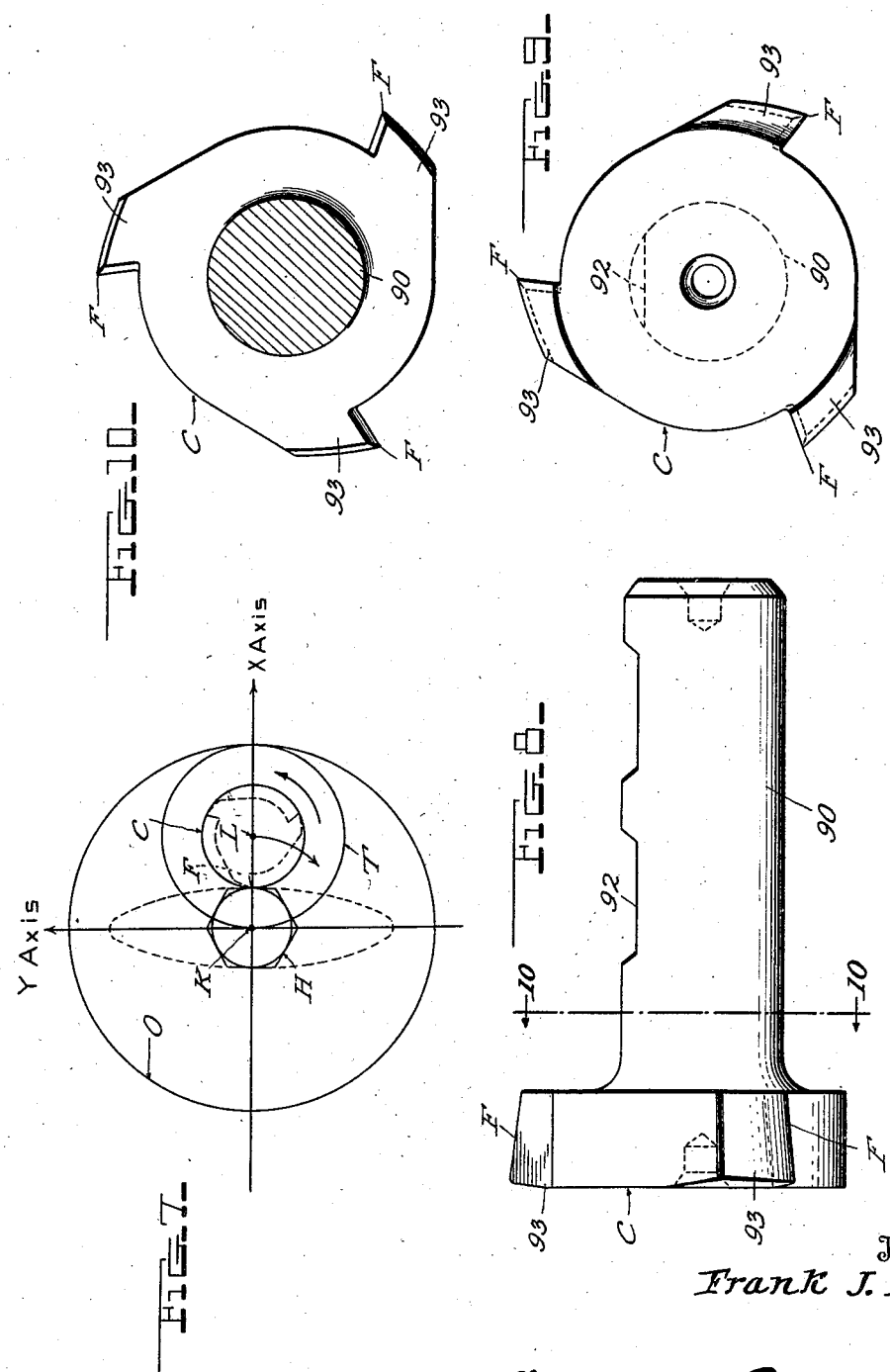

Patented July 8, 1947

2,423,696

UNITED STATES PATENT OFFICE 2,423,696

POLYGONAL GENERATING TOOL

Frank J. Fink, Chardon, Ohio, assignor to The Parker Appliance Company, Cleveland, Ohio, a corporation of Ohio Application February 24, 1944, Serial No. 523,712

3 Claims. (Cl. 90—11)

This invention relates to a procedure and apparatus for cutting polygonal shapes, and is more particularly concerned with the cutting of such shapes by relative rotations of the work and of a cutter about fixed axes while relatively feeding in the direction of the axes.

One of the features of the present invention is the provision of an apparatus by which a commercially acceptable polygonal shape may be produced by relative rotation of the work and of the cutter about axes which are fixed at a predetermined relative non-coincident position.

Another feature is the provision of an apparatus by which a regular polygonal shape can be produced by the relative rotation of the work and of the cutter about axes at a fixed distance apart, wherewith the cutter has a plurality of edges effective for cutting all of the faces of the polygonal shape.

A further feature of the invention is the provision of an apparatus for producing diagonally opposed flats upon work of circular section by employment of a cutter turning about an axis at a fixed distance from the axis of the work.

A further feature of the invention is a procedure and apparatus for cutting regular polygonal shapes having an even number of sides by employment of a cutter having half as many cutting edges as the number of sides in the polygonal shape, and with the employment of means whereby the work and the cutter turn relatively to one another in the same angular direction of travel and with the cutter turning at twice the angular speed.

Still another feature of the invention is the provision of an apparatus by which polygonal shapes can be formed on the work as an incident to the shaping of the work at other points of its structure, more specifically by the employment of turret lathe mechanisms for the purpose.

With these and other features as objects in view, an illustrative form of practicing the invention is shown on the accompanying drawings, in which:

Figure 1 is an elevation of a turret lathe having the invention applied thereto.

Figure 2 is a perspective view showing an illustrative article to be formed by the device of this invention.

Figure 3 is an upright sectional view substantially on line 3—3 of Fig. 5.

Figure 4 is an upright view on a radial plane, substantially on line 4—4 of Fig. 3.

Figure 5 is a corresponding view substantially on line 5—5 of Fig. 3.

Figure 6 is a detail view substantially on line 6—6 of Fig. 5.

Figure 7 is a diagrammatic view illustrating the cutting action.

Figures 8 and 9 are respectively a side view and an end view of a face milling cutter which can be employed in the illustrative form of practice, in preparing regular polygonal shapes having six or a greater even number of sides in commercial diameters up to 1½ inches.

Figure 10 is a transverse sectional view on line 10—10 of Fig. 8.

In Fig. 1, the invention is shown as applied to a turret lathe of a type which is now in common employment and is illustrated as having the base including an oil pan 10, and ways 11, the head stock 12 including the usual change gears and driving means, and the turret tail stock 13 which can be moved along the ways 11 by the capstan wheel 14 or automatically by power through the rotated shaft 15 and which carries the turret head 16 which can be rotated about a vertical axis either manually or automatically whereby to present a succession of tools for successional operations upon the work W. These elements by themselves are old and well known, and no claim of invention is made therein.

In the particular form of construction, likewise, the work W is illustratively chosen as a valve plug VP (Fig. 2) which is to be formed from a piece of bar stock B introduced through the machine spindle S in the usual way. This valve plug VP has a hexagonal portion H on its end, and the present invention is concerned particularly with the means for forming this hexagonal portion.

As shown in Fig. 3, the head stock 12 has a plate 20 bolted to its face and surrounding the end of the spindle S. A cover plate 21 is similarly bolted upon the end plate 20. The plates 20, 21 support bearings 22 of a hollow shaft member 23 which is illustrated as integrally formed with a gear 24. The hollow shaft has an aperture 25 extending therethrough and having a portion which is of essentially square cross section (see Fig. 4). A gear 26 is fixed to the spindle S for rotation therewith, and is in mesh with the gear 24.

One of the positions of the turret head 16 supports an attachment body 30 which has an aperture for receiving the horizontally journaled rocker pivot stub 31. This stub has the end plate 32 (Fig. 3) bolted thereto for preventing axial movement in one direction, while axial movement in the other direction is prevented by the contact of the rocker plate 33 against the body 30. The rocker cover plate 34 is attached to the rocker plate 33 by the screws 35.

A shaft 38 is journaled in bearings 39 provided in the plates 33, 34 parallel to the axis of the work W when the turret head is in position for forming the polygon H for rotation about an axis. The outer end 38a of the shaft 38 is squared and closely conforms to the aperture 25, and has a tapered nose for smooth introduction thereto. The shaft 38 has fixed thereon a gear 40 which is in mesh with a gear 41, which is fixedly connected to the tool holder shaft 42. This tool holder shaft 42 is supported by the radial and thrust anti-friction bearings 43 mounted in the cover plate 34 and held against axial movement by a shoulder in said plate 34 and by the annular clamping plate 44 which itself is held in position by the screws 45. At the other end of the shaft 42, it is supported by an anti-friction bearing 46 which can slide axially in the rocker plate 33. The nut 47 is threaded on the end of the shaft 42 and serves to hold the inner races of the anti-friction bearings tightly on the shaft, with inclusion of the washer and spacer elements 48, so that the anti-friction bearings 43 are clamped against the shoulder 49 of shaft 42. A dust protector plate 50 is secured over the aperture in the rocker plate 33 which receives the anti-friction bearing 46, and the dust and oil seals 51 are provided around the shafts 38 and 42, so that a sealed chamber is provided by the rocker plate 33 and the cover plate 34, within which the gears 40, 41 and the several bearings may work under appropriate conditions of lubrication.

The assembly of plates 33, 34 can rock about the axis of the shaft 38, and has a projecting ear 60 (Fig. 5) with a slot 61 therein for receiving the clamping bolt 62 by which the rocker assembly may be secured in a selected rocked position wherewith the axis of the illustrated tool holder shaft 42 is maintained parallel to and at a predetermined distance from the axis of the work W. The rocker assembly also has a second projecting ear 65 in which (Figs. 5 and 6) is pivotally mounted a stud 66 formed with an internally threaded part 67 engaged about the threaded spindle 68, which is rotatable in but held against relative axial movement by a bearing part 69 pivoted on the body 30 (Figs. 5 and 6) and is provided at its upper end with the handle 70. A graduated collar 71 is preferably fastened on the spindle 68 and cooperates with a pointer 72 for permitting accurately determined angular movements thereof, whereby a tangential effort may be exerted on the rocker assembly and a desired positioning of this rocker assembly accomplished while the bolt 62 is loose; and then this adjustment may be maintained by tightening the bolt 62.

The body 30 has an extension 80 above the pivot stub 31, to which is attached the split clamp socket 81 by the screws 82. This clamp socket receives the round cylindrical dowel bar 83 and holds the same firmly when the clamping screws 84 of this split socket 81 have been tightened, with presentation of the axis of the dowel bar 83 in a direction accurately parallel to the line of movement of the turret 13 and hence parallel to the shaft 38 and to the tool holder shaft 42.

The head stock 12 likewise has an extension piece 85 connected thereto and supporting a guide bushing 86 which is held fixedly in position by the clamping screws 87. The internal bore of the guide bushing 86 is closely fitted to the dowel bar 83 so that, when the tapered end of the dowel bar 83 has entered the bushing and the cylindrical surface of the bar is within this bore, there is an accurate positioning of the parts of the turret attachment with respect to the axis of the spindle S. The engagement of the end of the dowel bar 83 with the bushing 86 occurs before the end of the squared shaft 38a enters the hollow shaft member 23; and thus the latter parts are assisted to proper engagement and the operation of cutting is assisted by the support against torsional effects which otherwise would essentially only be resisted by the parts of the turret head, tail stock, ways and head stock.

The principle of operation is illustrated in Figure 7 in connection with the formation of a regular hexagon. The work H is to be operated upon by a tool having a cutting periphery C. The illustrative showing of Figs. 1 to 6 of the drawings, in which the cutter axis and the work axis are maintained fixed relative to the frame of the machine, is one manner of effecting relative motion of the cutter and the work. Since it is this relative motion of the cutter and the work which produces the effect, and since the mathematical relations are most easily described for the relative condition in which the work is considered as stationary and the tool as performing a rolling movement about the work as well as a rotation about its own axis, this latter form is illustrated in Figure 7.

For forming the hexagonal shape, the cutter C is provided with three equally spaced cutting teeth F, as illustrated in Figs. 8 and 9.

The axis K of the work is taken as the origin of the rectangular coordinates X and Y. The cutter C is to rotate at twice the angular speed of its relative translation about the origin K, and this may be represented by the rolling of a tool circle T about the inside of an orbital circle O of twice the diameter. It will be noted that the circle representing the outside diameter of the cutter C is smaller than the concentric tool circle T so that any point of the edge of the tool is at a radial distance from the center L of the tool circle which is less than the radius of the tool circle itself.

Under these conditions, if the radius of the cutting tool C be R and the radius of the inscribed circle of the hexagonal shape be B, then the radius of the tool circle T is (R plus B), and the radius of the orbital circle O is 2(R plus B).

Each cutting edge F of the tool, therefore, performs a hypotrochoidal movement which, under the particular conditions for a hexagon and with the dimensions as aforesaid, becomes simplified to an ellipse; and the three cutting edges move in three elliptical paths whose major axes are 120 degrees apart. Only one such ellipse is shown in Fig. 7, to avoid complexity. It will be noted that if the cutting edge F were on the tool circle T, it would harmonically traverse a straight line along the Y axis in Fig. 7; while if the cutting edge were at the axis L, it would traverse a circle concentric with the origin K. Between these extreme conditions of radius R for the cutting tool C, the actual ellipse approaches a straight line as the ratio R/B approaches infinity.

Furthermore, this ellipse is symmetrical about the coordinate axes and may be defined by the general equation:

$$\frac{X^2}{A^2} + \frac{Y^2}{B^2} = 1 \qquad (1)$$

Furthermore, an arc cut at the flattened side of the ellipse may thus closely approach a straight line for which the general equation is:

$$Y = MX \text{ plus } N \quad (2)$$

The actual departure from a straight line can be computed from these equations, assuming the aforesaid values for R and B.

It has been developed by computation, and established in practice, that so long as the ratio of R to B, or, in other words, the ratio of the diameter of the cutting tool to the diameter of the inscribed circle of the hexagonal shape, is less than substantially unity, the departure of one of the sides of the hexagonal shape from a true straight line is immaterially small for commercial purposes, amounting to less than about 1% of the size of the hexagon shape; that is, the diameter of the inscribed circle of the hexagon. In practice, this departure is of the following order, when a cutting tool C having a diameter of 1½ inches is employed for cutting standard sizes of hexagons:

Table

| Hex size 2B | Error B—Y |
|---|---|
| ½ in | 0.0001 |
| ⅜ in | 0.00015 |
| ½ in | 0.00085 |
| ⅝ in | 0.0025 |
| ¾ in | 0.0051 |
| 1 in | 0.0088 |
| 1¼ in | 0.0135 |
| 1½ in | |

While this relationship has been illustrated for a hexagonal shape, it will be understood that a similar analysis can be applied to the cutting of squares, octagons, decagons, etc., in which the number of sides to be cut is twice the number of cutting edges and the ratio of velocities is 2:1.

The tool to be employed has a number of cutting edges which is one-half the number of sides to be cut. Thus, in cutting a dodecagon with a six-tooth cutter, the same principles as announced above apply directly, if the work is of the same inscribed-circle diameter, but the accuracy is greater for the reason that the chordal length of each side is less and hence the elliptical arc is taken more closely from the portion of the ellipse having the greatest radius of curvature. In cutting a square, the error is slightly greater, but does not amount to 2% of the diameter of the inscribed circle when the ratio of R/B is less than substantially unity and hence a commercially satisfactory result is produced.

The presently preferred type of tool is illustrated in Figs. 8 to 10, as used for cutting a regular hexagon. This tool is provided with a shank 90, which may be clamped into the hollow chuck 42a provided at the end of the tool handle shaft 42, being secured therein (Fig. 3) by a set screw 91 which engages on a flat 92 of the tool shank 90. The cutting teeth 93 are three in number for a hexagon, the diameter of the concentric circle enveloping the maximum diameter of tooth edges F being 1½ inches for the cutter employed for the work illustrated by Table I above. The teeth are cut away to give clearance behind the cutting edge to provide relief, and a front rake is provided as shown in Fig. 9 and a general skew shape is given to the edge as shown in Figs. 8 and 10 for side rake. As this tool must cut while rotating and advancing in the direction along its axis, it is preferred to form it as a side milling cutter which tapers from the largest cutting diameter, and has a curved edge at this largest diameter; and it will be noted that the finishing cut is performed essentially at the maximum diameter. The tool can be reground a number of times, without suffering such loss of dimensional tolerance that the accuracy of the work substantially departs from the table.

The turret head 16 is of usual construction and can be provided at its other positions with other attachments by way of drills, box tools, reamers, and the like, so that the successive indexing of the head 16 and its feeding toward and from the head stock 12 will result in the production of the desired surfaces upon the end of the bar stock B to provide the work W, and to cut off the piece of work from the residue of the bar. As the arrangement and positioning of such tools is incidental to the particular shape given the work W, and follows usual practice in this respect, the expert can arrange and provide for such operations; and likewise can provide desired tools upon the cross slide as illustrated, in well known ways.

The form shown and described illustrates the application of the principle in one form of construction, but it will be understood that the invention may be practiced in many ways within the scope of the appended claims.

Having thus described the invention, what is claimed as new and desired to be secured by Letters Patent is:

1. In a turret type machine for producing work including a polygonal shape, a frame, a support rotatable on the frame for holding the work for turning about a work axis, a rotatable turret movable toward and from the support in a direction parallel to the work axis, a first gear rotatable about an axis fixed on the frame and eccentric to the work, a second gear, one of said gears having a non-round axial hole at its center, a pin coaxially connected to the other gear and closely conforming to said hole and slidable into and out of the same as the turret moves toward and from the work support in one rotated position of the turret, a gear on the support in driving relation to said first gear, a rocker mounted on the turret for rocking about the axis of said second gear, a cutter mounted on the rocker for rotation about an axis eccentric to the axis of the second gear and connected to be driven by said second gear, and means effective to hold said rocker at a selected rocked position and thereby to determine the spacing between the cutter axis and the work axis; said gears and pin forming a chain of drive connection between the work and the cutter whereby to determine the rate and direction of angular movement of the cutter relative to the work.

2. In a machine for cutting polygonal shapes with an even number of sides, a support for rotating the work about a work axis, a rotating cutter having half as many peripheral edges as there are sides in the polygonal shape, a rocker pivoted for movement about an axis parallel to the work axis, means for rotating the cutter concurrently with the rotation of the work and in the same angular direction and at twice the angular speed, said rotating means including a first gear concentric with the rocker axis, a driving gear fixed on the work support and in mesh with said first gear, a second gear concentric with the rocker axis and in driven relation to said first gear, and a cutter gear in mesh with the second gear, a cutter shaft connected to said cutter gear and journalled in said rocker for movement therewith bodily toward and from the work axis, said cutter shaft having a cutter holder thereon, the cutter gear and cutter shaft being rotatable about an axis parallel to the rocker axis, and means effective to move the cutter holder parallel to the work axis.

3. In a turret type machine for producing work including a polygonal shape, a frame, a support rotatable on the frame for turning the work about a work axis, a rotatable turret movable toward and from the support in a direction parallel to the work axis, an aligning bar member and a receiving member, one said member being mounted on the frame and the other on the turret and the members being interengaged when the turret moves toward the work in one rotated position of the turret, a first gear rotatable about an axis fixed on the frame and eccentric to the work, a second gear, one of said gears having a non-round axial hole at its center, a pin coaxially connected to the other gear and closely conforming to said hole and slidable into and out of the same as the turret moves toward and from the work support in one rotated position of the turret, a gear on the support in driving relation to said first gear, a rocker mounted on the turret for rocking about the axis of said second gear, a cutter mounted on the rocker for rotation about an axis eccentric to the axis of the second gear and connected to be driven by said second gear, and means effective to hold said rocker at a selected rocked position; said gears and pin forming a chain of drive connection between the work and the cutter whereby to determine the rate and direction of angular movement of the cutter relative to the work.

FRANK J. FINK.

REFERENCES CITED

The following references are of record in the file of this patent:

UNITED STATES PATENTS

| Number | Name | Date |
|---|---|---|
| 469,813 | Dahlgren et al. | Mar. 1, 1892 |
| 633,108 | Pearson | Sept. 12, 1899 |
| 1,485,687 | Melling | Mar. 4, 1924 |
| 1,575,742 | Drake et al. | Mar. 9, 1926 |
| 1,746,038 | Hegstad | Feb. 4, 1930 |

FOREIGN PATENTS

| Number | Country | Date |
|---|---|---|
| 586,349 | France | Jan. 3, 1925 |